US006766242B2

(12) United States Patent
Honda

(10) Patent No.: US 6,766,242 B2
(45) Date of Patent: Jul. 20, 2004

(54) ENGINE CONTROL APPARATUS

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/419,785

(22) Filed: Apr. 22, 2003

(65) Prior Publication Data

US 2003/0204304 A1 Oct. 30, 2003

(30) Foreign Application Priority Data

Apr. 24, 2002 (JP) ....................................... 2002-122161
Mar. 24, 2003 (JP) ....................................... 2003-081175

(51) Int. Cl.[7] .......................... F02D 45/00; G06F 19/00
(52) U.S. Cl. ............. 701/110; 123/406.62; 123/406.64; 73/116; 73/117.3
(58) Field of Search ................................ 701/110, 113, 701/114, 115; 123/406.6–406.64; 73/116, 117.3, 118.1

(56) References Cited

U.S. PATENT DOCUMENTS 4,664,082 A * 5/1987 Suzuki .................. 123/406.18
4,715,009 A 12/1987 Bohmler et al. ............ 364/565
5,264,844 A 11/1993 Itou et al. ..................... 341/11
5,706,783 A * 1/1998 Sawada ................ 123/406.47
5,711,283 A * 1/1998 Trigger, deceased ........ 123/637
5,970,947 A * 10/1999 Iida et al. .................. 123/295
6,341,253 B1 1/2002 Honda ........................ 701/102
6,473,687 B2 * 10/2002 Ando ......................... 701/114
6,575,136 B1 * 6/2003 Namari ................. 123/406.58

FOREIGN PATENT DOCUMENTS

JP B-7-18379 8/1986

* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

An engine control apparatus receives a rotation signal composed of a train of pulses at every interval of a predetermined angle and having a reference position intermediate of the pulse train. A microcomputer in the apparatus executes a detection of the reference position by an interrupt at every effective edge of the rotation signal. Moreover, the microcomputer detects the crankshaft angle position on the basis of the detection result at the beginning of the start of the engine, and on the basis of the reference position signal after the engine start when it is determined that a signal processing circuit is normally operating, by making the reference position signal from the signal processing circuit effective.

18 Claims, 13 Drawing Sheets

ENGINE CONTROL APPARATUS

CROSS REFERENCE TO RELATED APPLICATION

This application is based on and incorporates herein by reference Japanese Patent Applications No. 2002-122161 filed on Apr. 24, 2002 and No. 2003-81175 filed on Mar. 24, 2003.

FIELD OF THE INVENTION

The present invention relates to an engine control apparatus for detecting a crankshaft angle position with a rotation signal of an engine.

BACKGROUND OF THE INVENTION

The present invention relates to an engine control apparatus for detecting a crankshaft angle position with the rotation signal of an engine.

A control apparatus for a vehicular engine detects a crankshaft angle position by detecting the turns of the crankshaft of an engine by means of a rotation angle sensor and by introducing the rotation signal into a microcomputer. Moreover, the rotation signal is provided with a missing tooth reference position. Various methods for detecting the missing tooth are proposed.

In U.S. Pat. No. 5,264,844 (JP-A-5-66105), for example, the missing tooth detection is executed by a hardware circuit, which is provided with a rotation transmitter, an up-down counter 11 And an f/K frequency divider. In U.S. Pat. No. 6,341,253 (JP-A-2001-214794), the position of the crankshaft angle is detected by a microcomputer control to make an ignition control at a starting time when a premature ignition control is made for improving the startability. In U.S. Pat. No. 4,715,009 (JP-B-7-65905), a missing tooth is detected by measuring pulse periods of three successive pulses. In JP-B-7-18379, there are provided two larger and smaller missing tooth determination values, the larger of which is used at an engine starting time to detect the missing tooth thereby to prevent the erroneous missing tooth detection, as might otherwise be caused by the rotational fluctuation at the starting time.

According to the missing tooth detection by hardware, for example, the processing load on the microcomputer is reduced, but the missing tooth may be erroneously detected at low speed regions when the engine speed is unstable. According to the missing tooth detection by software (or microcomputer), on the other hand, a flexible response to the missing tooth detection can be made, but the processing load increases.

SUMMARY OF THE INVENTION

The invention has an object to provide an engine control apparatus, which can execute detection of a reference position properly immediately after an engine start or at a subsequent ordinary running time.

According to the present invention, an engine control apparatus comprises a rotation signal generating circuit, a signal processing circuit and a microcomputer. The rotation signal generating circuit generates a rotation signal composed of a train of pulses at each interval of a predetermined angle corresponding to the turns of the crankshaft of an engine and having a reference position of a different pulse width intermediate of the pulse train. The signal processing circuit measures the pulse interval by inputting the rotation signal and detects the reference position on the basis of the pulse interval, to output a reference position signal corresponding to the reference position. The microcomputer inputs the rotation signal and the reference position signal, to detect a crankshaft angle position from the rotation signal and the reference position signal thereby to execute various engine controls.

Especially, the microcomputer starts an interrupt at each effective edge of the rotation signal and executes the measurement of the pulse interval by the interrupt and the detection of the reference position on the basis of the pulse interval. It detects, by making the detection result of the reference position by the interrupt effective at the beginning of the start of the engine, the crankshaft angle position on the basis of the detection result. After the engine start and when it is determined that the signal processing circuit is normally operating, the microcomputer detects the crankshaft angle position with the reference position signal, by making the reference position signal from the signal processing circuit effective in place of the result of the reference position by the interrupt.

At the beginning of the engine start, moreover, the crankshaft angle position (or the rotational position of the engine) is detected from the detection result of the reference position by the software. Even at the time immediately after the engine start when the turns of the crankshaft are unstable, therefore, it is possible to detect the reference position properly and the crankshaft angle position precisely. On condition of the determination that the signal processing circuit is normally operating after the engine start, moreover, the reference position detecting means is switched to the hardware. After the engine start was completed, therefore, the detection of the reference position by the interrupt is not essential so that the processing load on the microcomputer can be reduced. As a result, the detection of the reference position can be properly executed from the engine start to the ordinary run.

Alternatively, the microcomputer detects the crankshaft angle position with a reference position signal from the signal processing circuit at an ordinary run of the engine by making the reference position signal effective. Moreover, the microcomputer starts an interrupt at each effective edge of the rotation signal when the speed of the engine drops to a predetermined threshold value or lower. The microcomputer executes the measurement of the pulse interval by the interrupt and the detection of the reference position on the basis of the pulse interval, and detects, by making the detection result of the reference position by the interrupt effective, the crankshaft angle position on the basis of the detection result.

In this case, when the engine speed drops, the turns of the crankshaft may become unstable when the engine speed drops, and the reference position detection by the microcomputer (or software) is executed temporarily only when speed drops. Therefore, the detection of the reference position by the interrupt can be executed necessarily to the minimum thereby to reduce the processing load on the microcomputer. Moreover, the detection of the reference position can be properly executed throughout all the drive ranges.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENT (First Embodiment)

Figure 1:
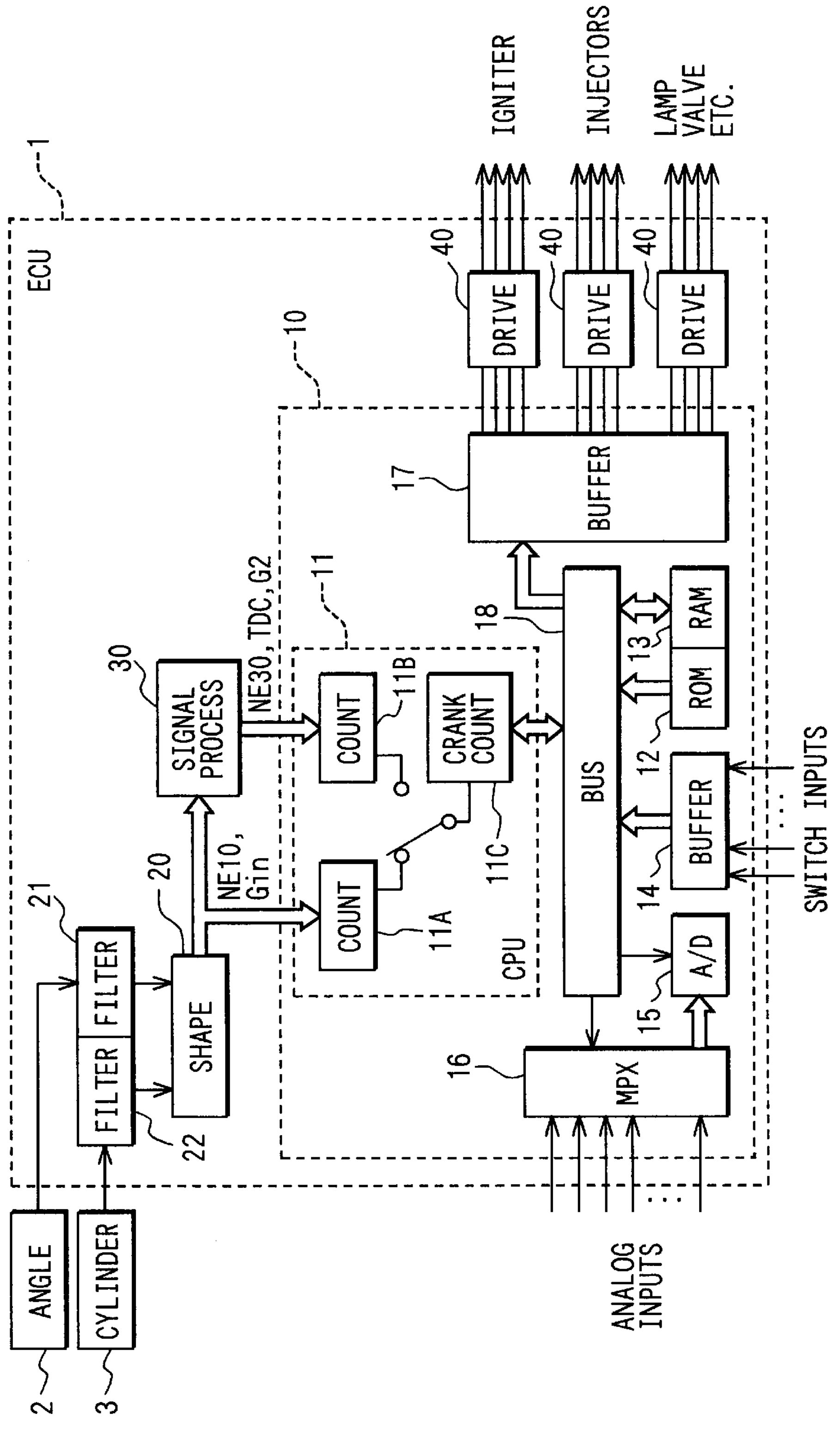
FIG. 1 is a circuit diagram showing an engine control apparatus according to the first embodiment of the present invention.

Referring first to FIG. 1, an ECU 1 is provided with a microcomputer 10, a waveform shaping circuit 20, a signal processing circuit 30 and a drive circuit 40 as its major components. The microcomputer 10 is provided with a CPU 11, a ROM 12, a RAM 13, an input buffer 14, an A/D converter 15, a multiplexer 16 and a general-purpose output buffer 17, all of which are connected through a bus 18. Analog inputs to be fetched by the multiplexer 16 contain sensor-detected values such as a throttle opening, an intake air flow and a water temperature. On the other hand, switch (digital) inputs to be fetched by the input buffer 14 contain at least an ignition switch and a shift switch of a transmission.

The waveform shaping circuit 20 corresponds to the “rotation signal generating circuit”, to which waveform signals detected by a rotation angle sensor 2 and a cylinder identifying sensor 3 are inputted through filters 21 and 22. The rotation angle sensor 2 detects the turns of a crankshaft such as the passage of the teeth of a pulse outer circumference by a pickup coil. On the other hand, the cylinder identifying sensor 3 detects the rotation of a camshaft such as the passage of the teeth of a pulse outer circumference by a pickup coil. The wave form shaping circuit 20 pulsates the waveform signals of the rotation angle sensor 2 and the cylinder identifying sensor 3 and generates and outputs a rotation signal NE10 (NE10 signal) and a cylinder identification signal Gin (Gin signal). These NE10 signal and the Gin signal are inputted to the microcomputer 10 and the signal processing circuit 30.

Figure 3:
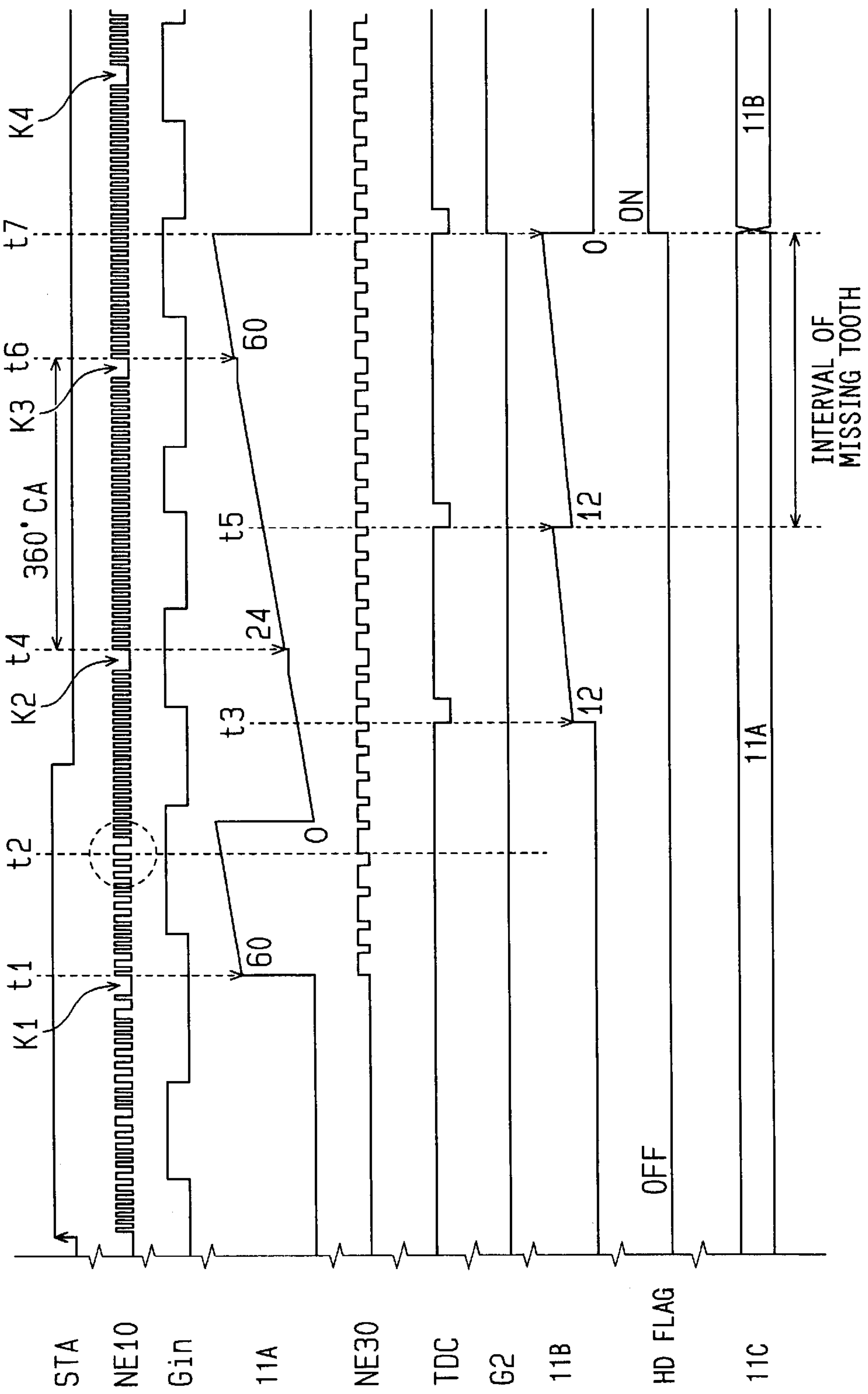
FIG. 3 is a time chart showing various signals developed in the first embodiment.

As shown in FIG. 3, the NE10 signal is so formed of a pulse train of each 10° CA (or each predetermined crankshaft angle interval) as to have a missing tooth (pulse) K1 to K4 of two pulses intermediate of the pulse train. The interval of the missing tooth is 360° CA and corresponds to the reference position of the crankshaft rotation. This Gin signal is a signal taking an H level (high level) and an L level (low level) at every predetermined angle repeatedly, so that the first and second of the missing tooth can be identified at two missing tooth detections in one cycle=720° CA, which corresponds to two rotations of the crankshaft and one rotation of the camshaft. In case letters K1 and K3 designate the first missing tooth whereas letters K2 and K4 designate the second missing tooth, for example, the first missing tooth can be identified if Gin=1 at the missing tooth detecting time, and the second missing tooth can be identified if Gin=H at the missing tooth detecting time.

The signal processing circuit 30 inputs the NE10 signal and the Gin signal from the waveform shaping circuit 20, and generates and outputs a rotation signal (NE30) of the 30° CA interval on the basis of those signals. On the other hand, the signal processing circuit 30 has a function to detect a missing tooth in the NE10 signal, and generates and outputs a reference position signal TDC and a first/second identification signal G2 for the cylinder identifications, from the missing tooth detection result and the aforementioned NE30 signal. These NE30 signal, the TDC signal and the G2 signal are output to the CPU 11, respectively. In this embodiment, the missing tooth position in the NE10 signal and the TDC signal correspond to each other, and the TDC signal corresponds to the reference position signal. The construction of the signal processing circuit 30 will be described in detail.

On the other hand, the CPU 11 in the microcomputer 10 is provided with: a counter 11A for counting operations on the basis of the NE10 signal and the Gin signal from the waveform shaping circuit 20; and a counter 11B for counting operations on the basis of the NE30 signal, the TDC signal and the G2 signal from the signal processing circuit 30. Specifically, the counter 11A is a counter that makes a counting operation at every effective edge (e.g., start edge) of the NE10 signal, i.e., at each 10° CA, and the counter 11B is a counter that makes a counting operation at each effective edge (e.g., start edge) of the NE30 signal, i.e., at each 30° CA. Moreover, either of these counters 11A and 11B is selectively effected, and its effective value is used as the value of a crank counter (or a crank counter in the CPU) each time. The CPU 11 identifies the crankshaft angle position on the basis of the value of the crank counter 11A and executes the various engine controls such as the ignition or the fuel injection.

Here in this embodiment, the NE10 signal corresponds to the first rotation signal, and the NE30 signal corresponds to the second rotation signal. In addition, the microcomputer 10 outputs control output signals individually to an igniter, an injector, a lamp, a solenoid valve and so on to control the engine.

Figure 2:
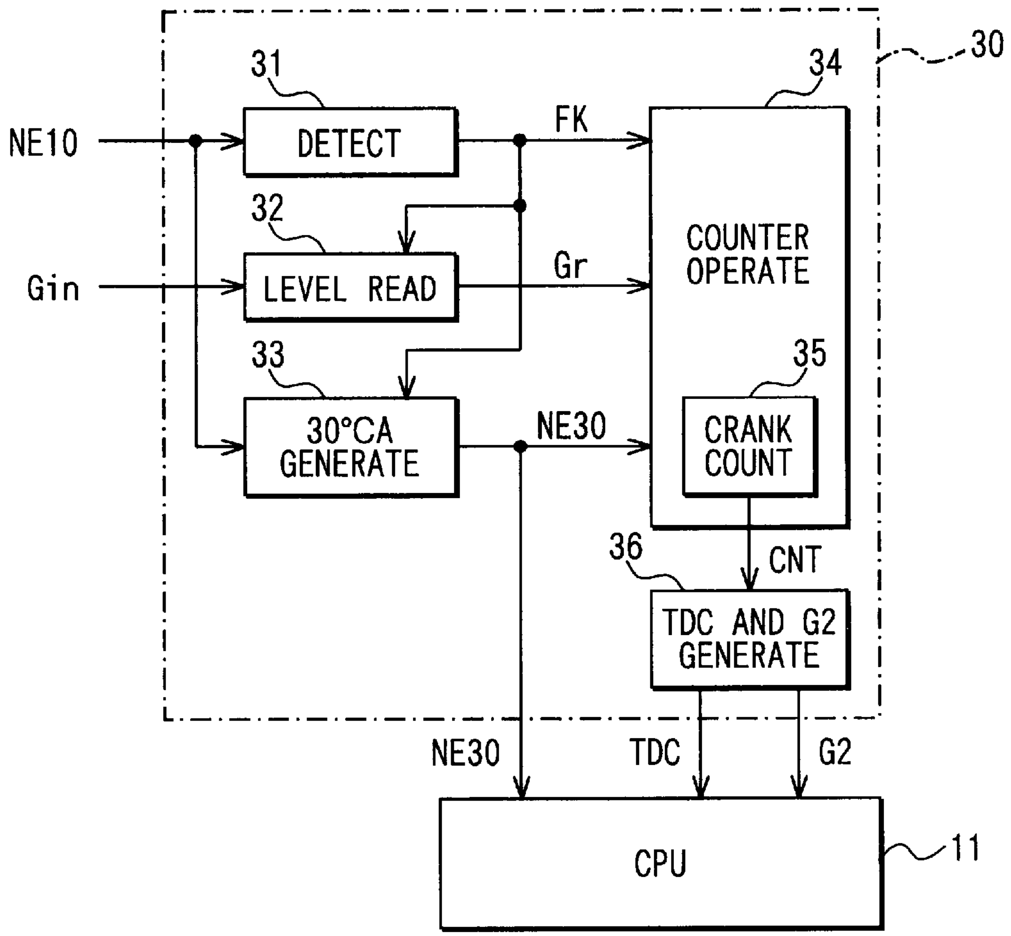
FIG. 2 is a block diagram showing a signal processing circuit in the first embodiment.

The signal processing circuit 30 is shown in FIG. 2 in detail. This signal processing circuit 30 is provided with a missing tooth detecting unit 31 for detecting a missing tooth position in the NE10 signal, a level reading unit 32 for reading the logic level of the Gin signal, a 30° CA signal generating unit 33 for generating the NE30 signal from the NE10 signal, a crank counter operation unit 34 for updating the value (or CNT value) of a crank counter 35 on the basis of the NE30 signal, and an identification signal generating unit 36 for generating the TDC signal and the G2 signal on the basis of the CNT value.

Figure 4:
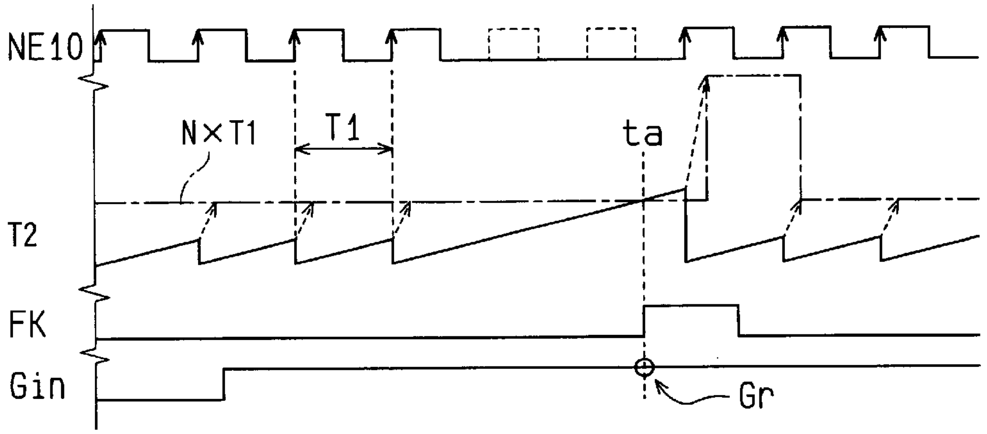
FIG. 4 is a time chart showing a missing tooth detection in the first embodiment.

The missing tooth detecting unit 31 detects the missing tooth of the NE10 signal as shown in FIG. 4. Specifically, the missing tooth detecting unit 31 resets a timing timer value T2 to 0, each time the NE10 signal rises from the L level to the H level, and measures the latest pulse interval T1 of the NE10 signal from the timer value T2 immediately before the reset. As shown by single-dotted line in FIG. 4, moreover, the pulse interval T1 measured is multiplied by N to set the threshold time period (N×T1) for the missing tooth detection. In this embodiment, the missing tooth portion is formed by omitting two pulses, and the value N is set between 2 and 3, e.g., 2.5.

The missing tooth detecting unit 31 determines that the missing tooth detection has been made, at the time (at timing ta of FIG. 4) when the timer value T2 exceeds the threshold value time (N×T1), and sets a missing tooth detection signal FK to the H level. This missing tooth detection signal FK is returned to the L level at the next time when the NE10 signal falls. In view of the rise of the missing tooth detection signal FK to the H level, it is known that the missing tooth detection has been made at the level reading unit 32, the 30° CA signal generating unit 33 and the crank counter operation unit 34.

The level reading unit 32 reads the logic level of the Gin signal at the timing when the missing tooth detection signal FK rises, as shown in FIG. 4, and stores the logic level (read level) Gr of the read Gin signal.

Figure 5:
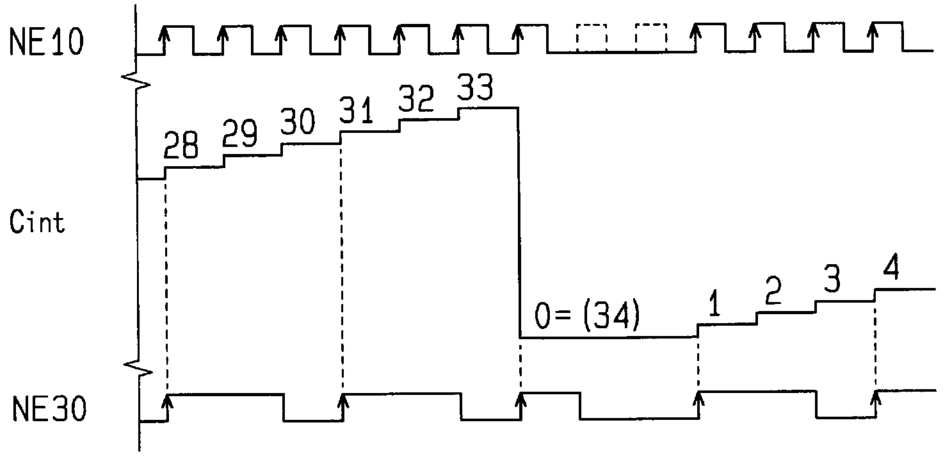
FIG. 5 is a time chart showing an NE30 signal in the first embodiment.

Next, as shown in FIG. 5, the 30° CA signal generating unit 33 counts up the value of the internal counter one by one each time the NE10 signal rises from the starting point at the missing tooth detecting time, and returns that value to 0 when the value takes 34. In case the value of the internal counter is 1 to 33, moreover, the NE30 signal is set to the H level, in case the residue of the division of the value of the internal timer by 3 is 1 or 2, and to the L level in case the residue of the division of the value of the internal timer by 3 is 0. When the value of the internal counter Cint is returned from 34 to 0, on the other hand, the NE30 signal is set to the H level for a predetermined time period by the internal timer. By these operations, the NE30 signal to rise for each 30° CA in synchronism with the NE10 signal is outputted from the 30° CA signal generating unit 33.

Figure 6:
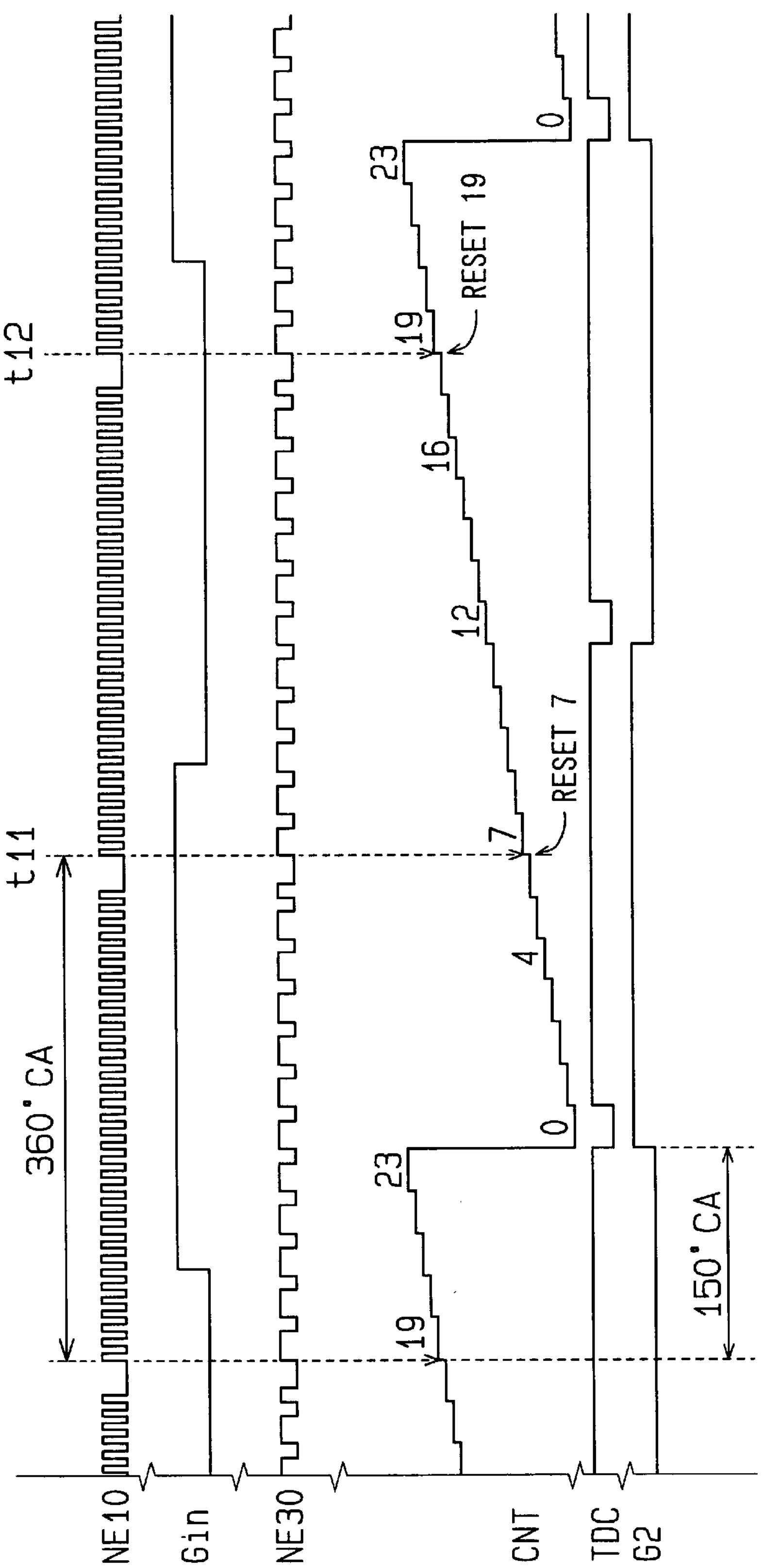
FIG. 6 is a time chart showing a TDC signal and a G2 signal in the first embodiment.

Next, the crank counter operation unit 34 is provided with the crank counter 35 for counting the CNT value and updates the CNT value indicating the accumulated rotation angle of two turns of the crankshaft as a resolution of 30° CA, each time the NE30 signal rises. As shown in FIG. 6, more specifically, the crank counter operation unit 34 basically counts up the CNT value by one at each 30° CA, and returns the CNT value to 0 when this CNT value exceeds 23 (or reaches 24). As a result, the CNT value is counted up by 1 within a range of 0 to 23 corresponding to the 720° CA.

Moreover, the crank counter operation unit 34 executes the initialization of the CNT value in accordance with the missing tooth detection signal FK from the missing tooth detecting unit 31 and the read level Gr of the Gin signal by the level reading unit 32. Specifically, the CNT value is initialized to 19, if the read level Gr at the missing tooth detecting time is at the L level, but to 7 if the read level Gr is at the H level. As a result, the CNT value is initialized to 7 at timing t11 but to 19 at timing t12, as shown in FIG. 6. Here, the values 7 and 19 are different from each other by a value (12) corresponding to the 360° CA so that the continuity of the CNT value is not lost by the initialization.

Here in FIG. 6, the timings (e.g., t11 and t12) of the missing tooth detection and the rising timing of the NE10 signal immediately after the missing tooth are shown to become identical. As a matter of fact, however, the rise of the missing tooth detection signal FK is slightly before (timing ta of FIG. 4) the rise of the NE10 signal immediately after the missing tooth detection.

Next, the identification signal generating unit 36 refers to the CNT value of the crank counter 35 and generates the TDC signal and the G2 signal in accordance with the CNT value. As shown in FIG. 6, more specifically, the identification signal generating unit 36 sets the TDC signal to the L level temporarily in case the CNT value is 0 or 12. Moreover, the identification signal generating unit 36 sets the G2 signal to the H level, in case the CNT value is 0 to 11, but to the L level in case the CNT value is 12 to 23. In this embodiment, when the crankshaft is turned by 150° CA after the missing tooth was detected, the TDC signal takes the L level.

Next the operations of the microcomputer 10 will be described. In this microcomputer 10, the CPU 11 starts not only the interrupt (NE10 interrupt) at every start edge of the NE10 signal but also the interrupt (NE30 interrupt) at every start edge of the NE30 signal. In this case, the counter 11A is caused to operate by the NE10 interrupt, and the counter 11B is caused to operate by the NE30 interrupt. Of these two interrupt, the NE10 interrupt is executed prior to the NE30 interrupt.

Figure 7:
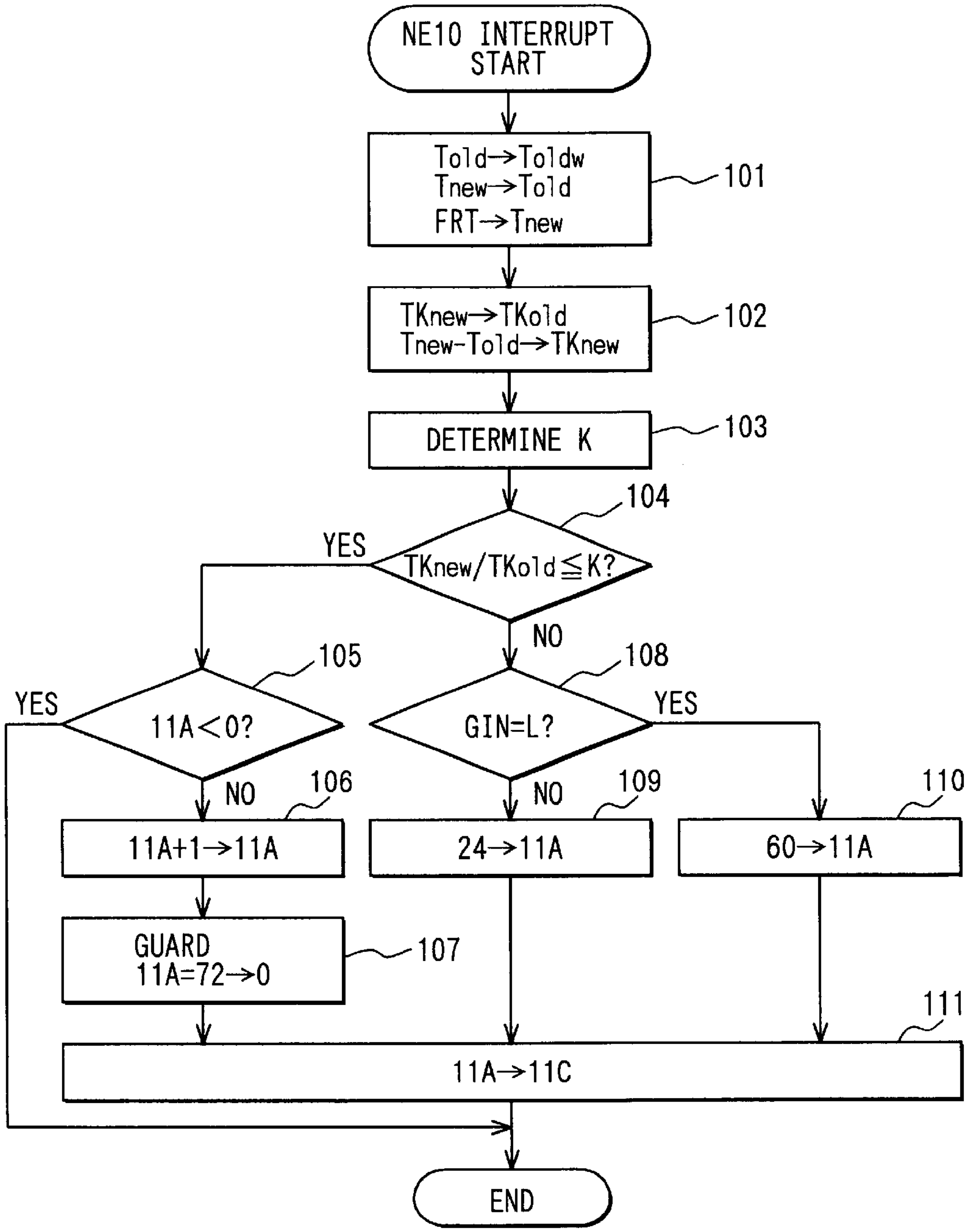
FIG. 7 is a flow chart showing NE10 interrupt in the first embodiment.

FIG. 7 is a flowchart showing the NE10 interrupt. After this start, at first step 101, the edge reading times Told and Tnew are stored in Toldw and Told, respectively. A free-run timer value FRT is stored in Tnew. At next step 102, the pulse intervals TKnew and "Tnew−Told" are stored in TKold and TKnew, respectively.

At step 103, a missing tooth identification value K is determined. At this time, the missing tooth identification value K is set variable according to the engine running state of each time. For example, a large missing tooth identification value K is set at the engine starting time, but otherwise a small missing tooth identification value K is set. In this embodiment, two pulses are missing at the missing tooth position so that the value K is set in the vicinity of 2.4. However, it is also possible that the missing tooth identification value is set at a fixed value.

After this, at step 104, the missing tooth identification is executed by comparing this value TKnew and the latest value TKold of the pulse interval. Specifically, it is discriminated whether or not the value "TKnew/TKold" is no more than the missing tooth identification value K. If TKnew/TKold≦K, no missing tooth is identified, and the routine advances to step 105. If TKnew/TKold>K, on the contrary, a missing tooth is identified, and the routine advances to step 108.

At step 105, it is discriminated whether or not the value of the counter 11A at this time is less than 0. If the engine is at the beginning of the start and if the counter 11A is set to the initial value (−1), the answer of step 105 is YES, and this procedure is ended as it is. If the counter 11A is at no less than 0, on the other hand, it is counted up by 1 at step 106. At subsequent step 107, the counter 11A is set to 0 when its value reaches the upper limit value 72. Finally at step 111, the value of the counter 11A at this time is copied to and stored in the crank counter 11C.

If TKnew/TKold>K (at the missing tooth detection time), on the contrary, it is discriminated at step 108 whether or not the logic level of the Gin signal is at the L level. The counter 11A is set to 24 (at step 109) if at the H level and to 60 (at step 110) if at the L level. Finally at step 111, the value of the counter 11A at that time is copied to and stored in the crank counter.

Figure 8:
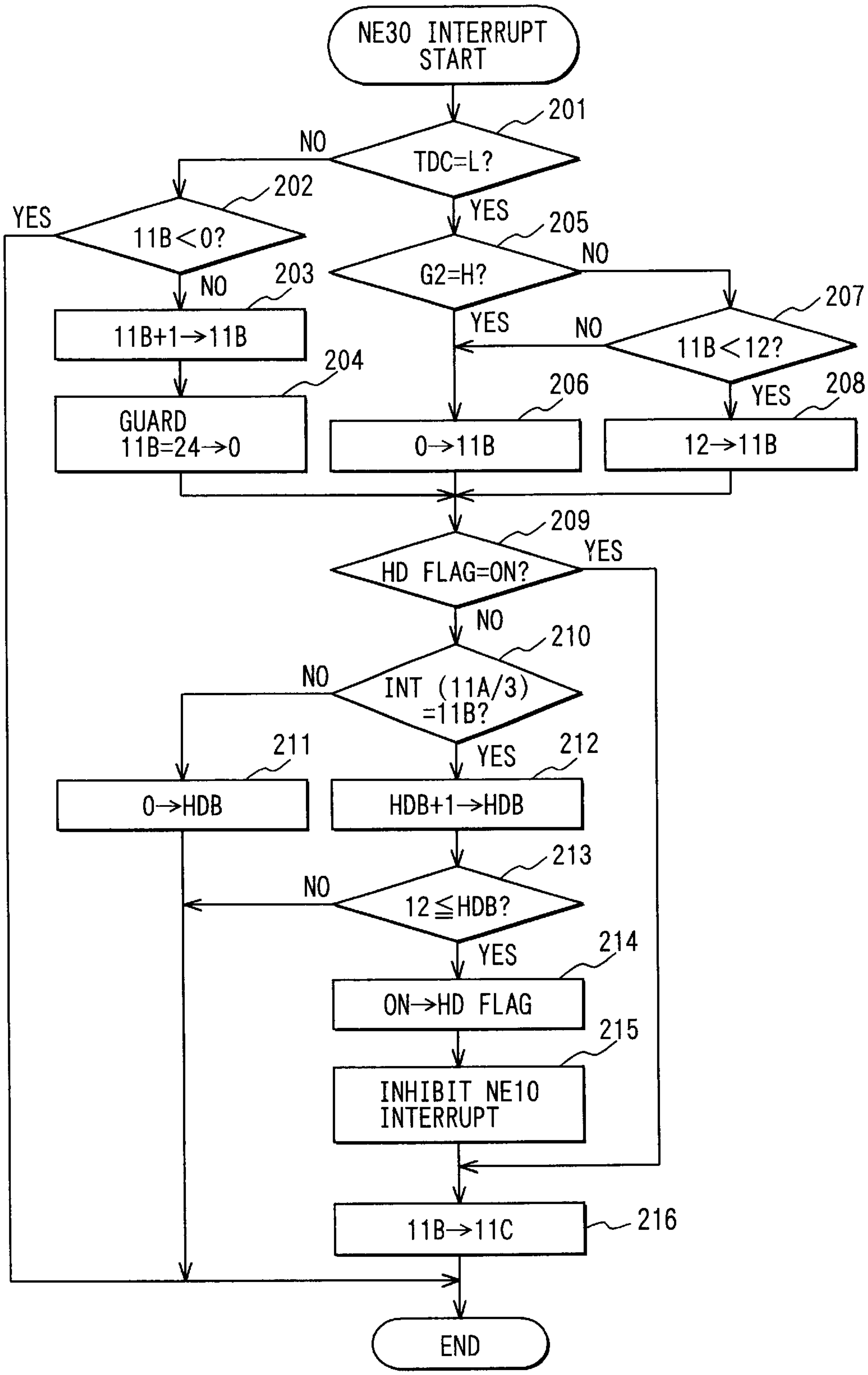
FIG. 8 is a flow chart showing an NE30 interrupt in the first embodiment.

Next, FIG. 8 is a flow chart showing the NE30 interrupt. At steps 201 to 208 after the start, the counter 11B is operated with the TDC signal and the G2 signal. At step 201, more specifically, it is discriminated whether or not the TDC signal is at the L level. The routine advances to step 202, if TDC=H, but to step 205 if TDC=L.

At step 202, it is discriminated whether or not the value of the counter 11B at this time is less than 0. If the engine is at the beginning of the start and if the counter 11B is set at the initial value (−1), the answer of step 202 is YES, and this routine is ended as it is. If the counter 11B is no less than 0, on the contrary, the counter 11B is counted up by 1 at step 203. At subsequent step 204, the counter 11B is set to 0 when its value reaches the upper limit 24.

In the case of TDC=L, on the contrary, it is discriminated whether or not the G2 signal is at the H level. If G2=H, the counter 11B is set to 0 at step 206. If G2=L, on the contrary, it is discriminated at step 207 whether or not the value of the counter 11B is no more than 12. The counter 11B is set to 0 at step 206, if the counter 11B is equal to or more than 12, but to 12 at step 208 if the counter 11B is less than 12.

After the counter 11B was operated, it is discriminated at step 209 whether or not an HD flag is ON. This HD flag discriminates whether or not the signal processing circuit 30 comes to a state for the normal operations. If this flag is switched from OFF (initial value) to ON after the engine start, it is determined that the signal processing circuit 30 comes to the normal operation state.

If the HD flag=OFF at the beginning of the engine start, therefore, the routine advances to step 210. At step 210, it is discriminated whether or not the ⅓ value of the counter 11A (i.e., the counter 11A/3) matches the value of the counter 11B. In the mismatching case, the HD counter B (HDB) is cleared to 0 at step 211, and this routine is ended. Here, this HD counter B counts the number of times, in which "Counter 11A/3=Counter 11B" holds.

In the matching case, on the contrary, the HD counter B is incremented by 1 at step 212. After this, it is discriminated at step 213 whether or not the HD counter B is no less than 12 (i.e., the value corresponding to the 360° CA). On the condition of this answer of YES, the HD flag is turned on at step 214, and the NE10 interrupt (i.e., the interrupt of FIG. 7) are inhibited at step 215.

Finally at step 216, the value of the counter 11B is copied to and stored in the crank counter 11C. After the HD flag is turned on, the answer of step 209 is YES so that the value of the counter 11B is copied each time to the crank counter 11C.

A series of operations at the engine starting time will be described with reference to the time chart of FIG. 3. In FIG. 3, the engine is started when the starter signal STA is turned on. Here, at ON of the signal STA, the individual counters are set or initialized to −1, and the individual flags are initialized to OFF.

After the engine start, at timing t1, the missing tooth is detected on the basis of the pulse interval across it by the NE10 interrupt of FIG. 7, and the Gin signal at this time is at the L level so that the counter 11A is set to 60. Subsequently, the counter 11A is counted up for each 10° CA and is returned to 0 when it reaches 72. At the beginning of the engine start, in the CPU 11, the value of the counter 11A is copied to the crank counter 11C and is used for the engine control (actually, the counter is set to A/3, and the signal of 30° CA is employed). In the signal processing circuit 30, on the other hand, the missing tooth is detected at the same timing t1 by the missing tooth detecting unit 31, and the NE30 signal is then outputted by the 30° CA signal generating unit 33.

Here, it is thought that the engine is rotationally unstable immediately after its start and that the pulse interval temporarily extends even in the ordinary pulse train portion, as enclosed by a dotted line around timing t2 in the figure. In this case, for the missing tooth detection by the CPU 11, the missing tooth is not erroneously detected at timing t2, if a large value is set in advance as the missing tooth identification value K at the engine starting time. Therefore, the operations of the counter 11A are continued as they are, as shown.

In the missing tooth detection by the signal processing circuit 30, on the contrary, the threshold value (i.e., N of FIG. 4) of the missing tooth detection cannot be freely changed so that the missing tooth is erroneously detected at the timing t2. When the missing tooth is erroneously detected in the signal processing circuit 30, the value CNT of the crank counter 35 is erroneously counted, and the TDC signal takes the L level temporarily at timing t3, as turned by 150° CA from the timing t2 (FIG. 6). At the timing t3, therefore, the G2 signal at this time takes the L level so that the counter 11B is set to 12 by the NE30 interrupt of FIG. 8. At this instant, the missing tooth is erroneously detected at the timing t2 so that the value of the counter 11B does not match the actual crankshaft angle position.

After this, the missing tooth is normally detected at timing t4. At timing t5 turned by 150° CA from the timing t2, therefore, the TDC signal temporarily takes the L level so that the counter 11B is set again to 12. As a result, the value of the counter 11B matches the actual crankshaft angle position. Here, the counter 11A is set to 24 and 60 in response to the logic levels of the Gin signal at the missing tooth detecting times of the timings t4 and t6.

At and after the timing t5, both the counter 11A and the counter 11B match the actual crankshaft angle positions, the period of which is measured. In the NE30 interrupt of FIG. 8, more specifically, the HD counter B is counted on condition of the holding of "Counter 11A/3=Counter 11B". At timing t7 after the rotation of 360° CA (i.e., one period from TDC=L to the next TDC=L), moreover, it is confirmed that the signal processing circuit 30 is normally operating, and the HD flag is switched from the prevailing OFF to ON.

At and after the timing t7, the value of the counter 11B is copied to the crank counter 11C and is employed for the engine control in the CPU 11. At and after the timing t7, moreover, the counter 11A is not needed so that the NE10 interrupt is inhibited to reduce the processing load by the CPU 11.

The following advantages can be obtained according to the first embodiment.

(1) At the beginning of the engine start, the crankshaft angle position is detected (i.e., the crank counter inside of the CPU is determined) from the missing tooth detection region by the microcomputer 10 (CPU 11). Therefore, the missing tooth can be properly detected even at the timing of unstable turns of the crankshaft immediately after the engine start so that the crankshaft angle position can be precisely detected. Especially at this time, a flexible missing tooth detection according to the prevailing engine state can be realized according to the microcomputer 10 by setting the missing tooth determination value K variable according to the engine running state. After the engine start, moreover, the missing tooth detection by the signal processing circuit 30 is made effective on condition that it is determined that the signal processing circuit 30 is normally operating. After the engine start was completed, therefore, the missing tooth detection by the interrupt (or the software) is not essential so that the processing load on the microcomputer 10 can be reduced. As a result, the missing tooth detection can be properly executed from the engine start to the ordinary run. Moreover, the engine startability is improved by that effect.

(2) In the microcomputer 10, the value of the counter 11A with the NE10 signal and the value of the counter 11B with the NE30 signal are selectively employed according to the state after the engine start. Therefore, the optimum counter value can be properly used while considering the reliability and the processing load on the microcomputer 10.

(3) In case the value of the counter 11A and the value of the counter 11B are matching continuously for a predetermined period, it is determined that the signal processing circuit 30 is normally operating. Therefore, it can be reliably determined that the operations of the signal processing circuit 30 are stabilized after the engine start.

(4) By comparing the value of the counter 11A and the value of the counter 11B for a period including at least one period referring to the output of the TDC signal, it is determined whether or not the signal processing circuit 30 is normal. Therefore, this determination can be executed reliably and properly. This period could be set not only to one period but also two periods.

(5) It can be supposed that the NE10 interrupt (i.e., the interrupt for the counting of the counter 11A) and the NE30 interrupt (i.e., the interrupt for the counting of the counter 11B) simultaneously occur. However, the NE10 interrupt is given the higher priority so that it can be attained without fail. At the beginning of the engine start, therefore, the accuracy of the value of the counter 11A is enhanced to improve the engine startability.

(6) The crankshaft angle position is decided by using the Gin signal in addition to the NE10 signal. Therefore, it is advantageous that the crankshaft angle position can be decided more earlier than the case having no Gin signal. However, this Gin signal is not essentially requisite in this embodiment, and the detection of the missing tooth and the decision of the crankshaft angle position could be done without the Gin signal.

(Second Embodiment)

In the second embodiment, the crankshaft angle position is detected by means of the value of the counter 11A with the NE10 signal, in the same manner as in the first embodiment. Therefore, even if the signal processing circuit 30 cannot be properly started and stays abnormal, the engine is started without any problem. If the signal processing circuit 30 becomes abnormal (or is not normally started) immediately after the engine start so that the counter 11B does not correctly count, therefore, the abnormality is detected in this second embodiment by the NE10 interrupt, and the signal processing circuit 30 is reset.

Figure 9:
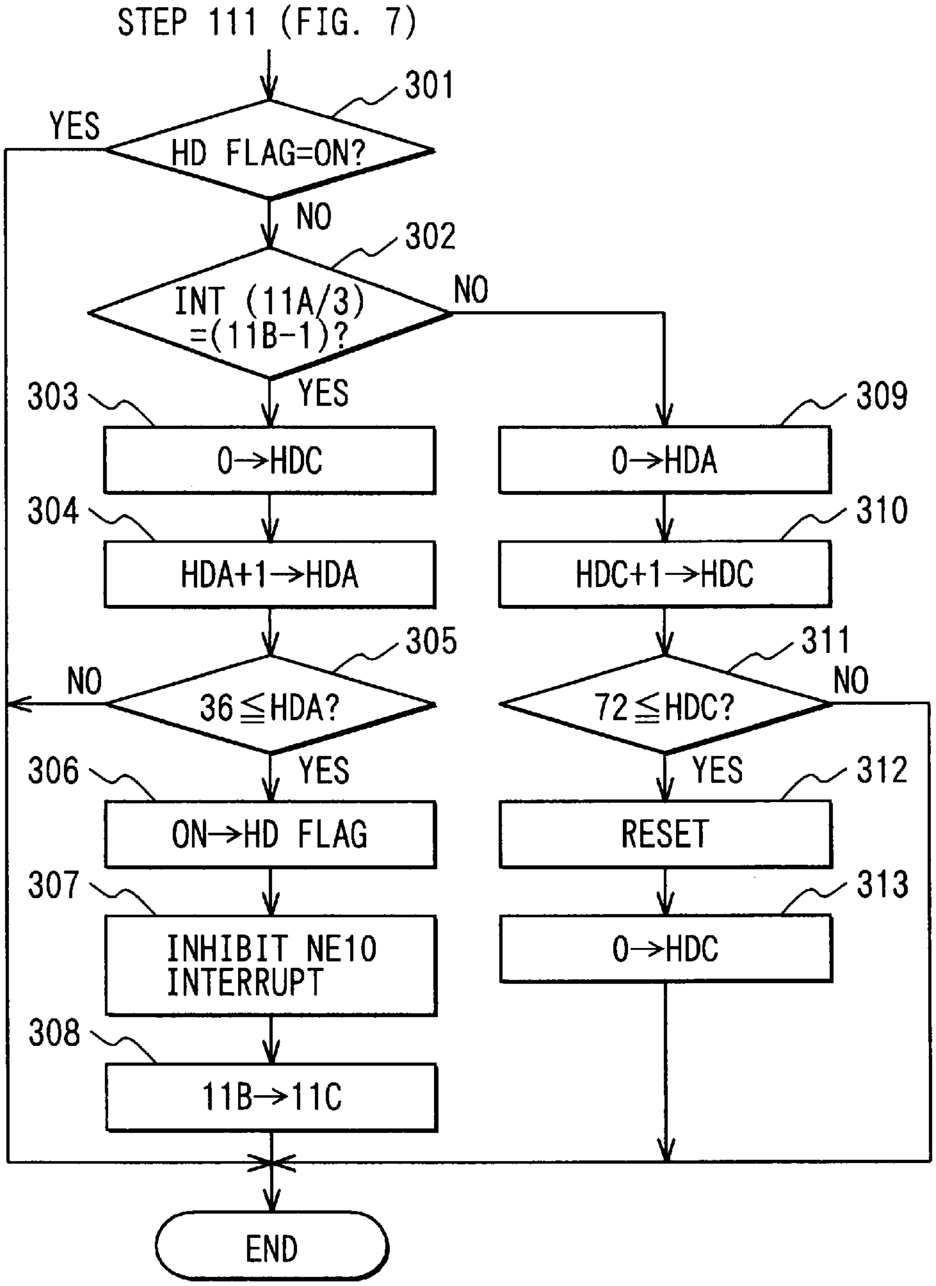
FIG. 9 is a flow chart showing a portion of the NE10 interrupt in the second embodiment of the present invention.

Specifically, the routine of FIG. 9 is executed at the end of the NE10 interrupt. FIG. 9 is a flow chart showing the routine to be executed subsequent to the NE10 interrupt of FIG. 7 (or immediately before the RET subsequent to step 111 of FIG. 7). In this routine, the HD counter A (HDA) is a counter for measuring the period for which the value of the counter 11A and the value of the counter 11B are continuously matching, and an HD counter C (HDC) is a counter for measuring the period for which the value of the counter 11A and the value of the counter 11B continuously fail to match.

After step 111 of FIG. 7, the routine shifts to step 301 of FIG. 9. At step 301, moreover, it is discriminated whether or not the HD flag is ON, that is, whether or not the signal processing circuit 30 comes into the state for the normal operations. At the beginning of the engine start, the HD flag=OFF, and the routine advances to step 302. At step 302, it is discriminated whether or not "Counter 11A/3=Counter 11B−1" holds. The reason for "B−1" is because the higher priority is given to the NE10 interrupt than the NE30 interrupt so that the latest value of the counter 11B is a target of comparison.

In case the answer of step 302 is YES, the HD counter 11C is cleared to 0 at step 303, and the HD counter A is incremented by 1 at subsequent step 304. After this, it is discriminated at step 305 whether or not the HD counter A takes a value no less than 36 (corresponding to 360° CA). On condition of YES, moreover, the HD flag is turned on at step 306, and the NE10 interrupt (or the aforementioned interrupt of FIG. 7) are inhibited at step 307.

Finally at step 308, the value of the counter 11B is copied to the crank counter 11After ON of the HD flag, the answer of step 301 is YES each time, and the routine at and after step 302 is skipped over.

In case the answer of step 302 is NO, the HD counter A is cleared to 0 at step 309, and the HD counter 11C is incremented by 1 at subsequent step 310. After this, it is discriminated at step 311 whether or not the HD counter 11C takes 72 (corresponding to 720° CA) or more. If this answer is YES, the signal processing circuit 30 is reset at step 312. Specifically, the CPU 11 outputs a reset signal to the crank counter operation unit 34 in the signal processing circuit 30. At subsequent step 313, the HD counter 11C is set to 0, and this routine is ended.

According to the second embodiment, the signal processing circuit 30 is reset in case the value of the counter 11A and the value of the counter 11B are mismatching continuously for a predetermined period, so that the operations of the signal processing circuit 30 can be normalized. The mismatch between the counters 11A and 11B is detected in terms of 720° CA (i.e., two periods of missing tooth), which could be changed.

(Third Embodiment)

Figure 10:
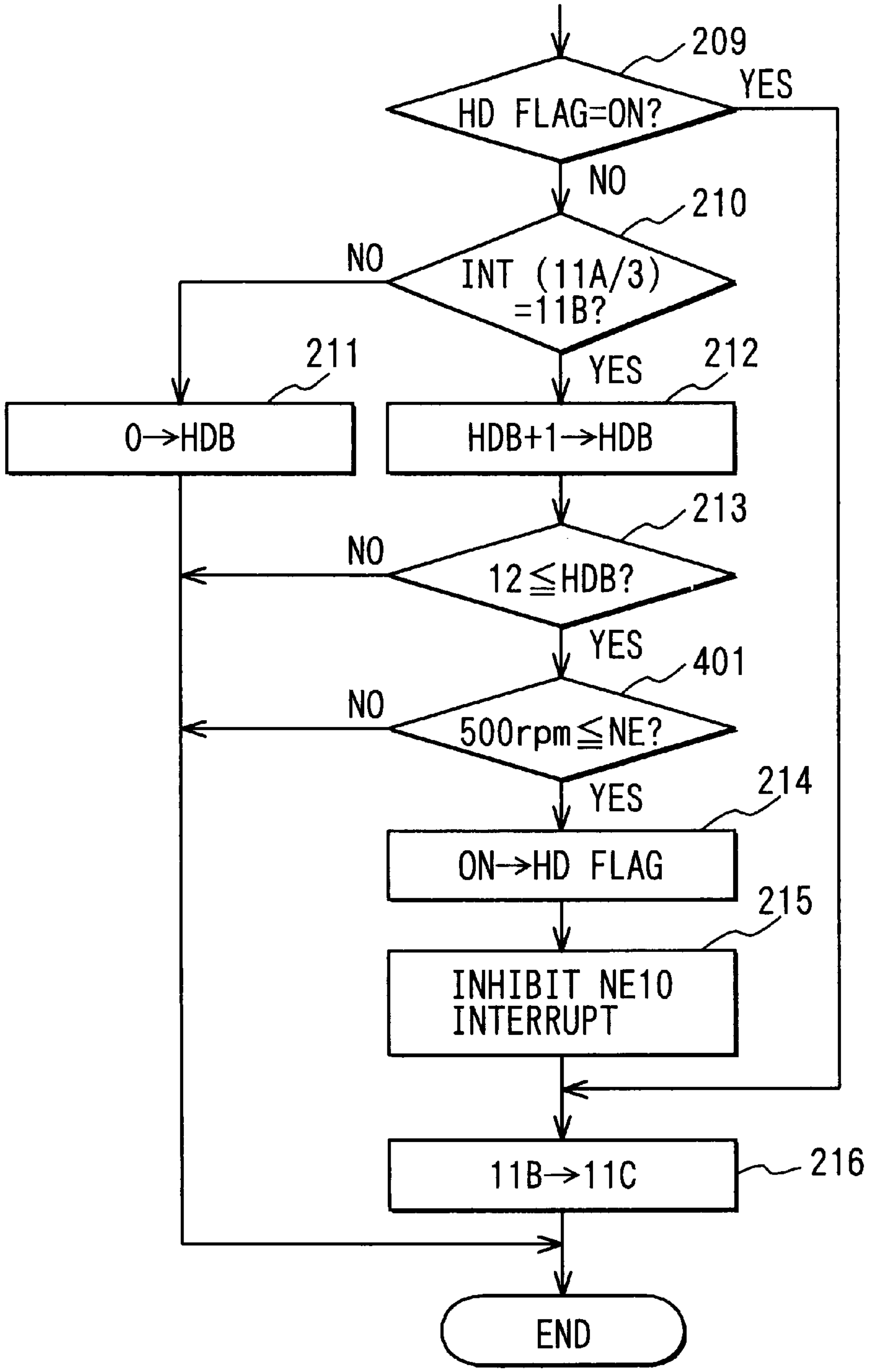
FIG. 10 is a flow chart showing a portion of the NE30 interrupt in the third embodiment of the present invention.

In the third embodiment, the NE30 interrupt (FIG. 8) of the first embodiment is partially changed as shown in FIG. 10. In FIG. 10, the newly added portion is located at step 401 immediately after step 213. In case both the answers of step 213 and step 401 are YES, the HD flag is turned on, and the NE10 interrupt is inhibited (at steps 214 and 215). In case the value of the counter 11A and the value of the counter 11B are mismatching continuously for a predetermined period and in case the engine rotation speed NE after the start reaches a predetermined revolutions per minute (e.g., 500 rpm), it is determined that the signal processing circuit 30 is normally operating.

According to the routine of FIG. 10, it is added to the condition that the engine speed is raised after the engine start not by cranking the engine by the starter but by the ignition or the fuel injection. In the state of the reliable engine start, therefore, the normal operations of the signal processing circuit 30 can be determined more reliably.

(Fourth Embodiment)

Figure 11:
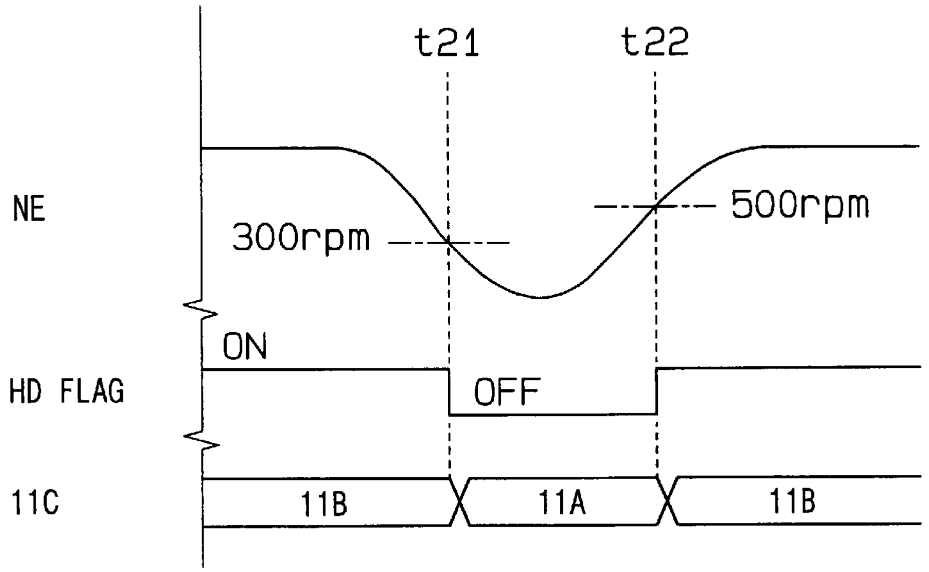
FIG. 11 is a time chart showing an interchange of counters at the time of decrease in a rotation speed in the fourth embodiment of the present invention.

In the above embodiments, the value of the counter 11A with the NE10 signal and the value of the counter 11B with the NE30 signal immediately after the engine start are selectively employed to interchange the rotational position detections by the software and by the hardware. However, in the fourth embodiment, the rotational position detections by the software and by the hardware are interchanged in case the engine rotation temporarily becomes unstable in the course of the ordinary engine run as shown in FIG. 11.

More specifically, at the ordinary running time (at and before a timing t21) of the engine, the value of the counter 11B is made effective and is copied for use to the crank counter 11C. At the timing t21 of the ordinary running time, in which the engine speed NE drops to lower than a predetermined threshold value (e.g., 300 rpm), the value of the counter 11A is made effective in place of the counter 11B and is copied for use to the crank counter 11C. In short, at the timing t21, the NE10 interrupt is started so that the rotational position detection by the software is executed. At later timing t22 in which the engine speed NE rises again above the predetermined threshold value (e.g., 500 rpm), the value of the counter 11B is made effective again and is copied for use to the crank counter 11C to stop the NE10 interrupt. This operation occurs in the economy running system, for example. That is, the engine speed rises again, if the accelerating operation is done intermediately in the attempt of the engine stop as the vehicle stop.

In this case, the turns of the crankshaft may become unstable when the engine speed drops, and the missing tooth detection by the microcomputer 10 (or the software) is temporarily executed only when the speed drops. Therefore, the missing tooth detection by the interrupt (or the NE10 interrupt) is made to a minimum as necessary so that the processing load on the microcomputer 10 can be reduced. Moreover, the missing tooth detection can be properly executed throughout all the drive ranges.

(Fifth Embodiment)

Figure 12:
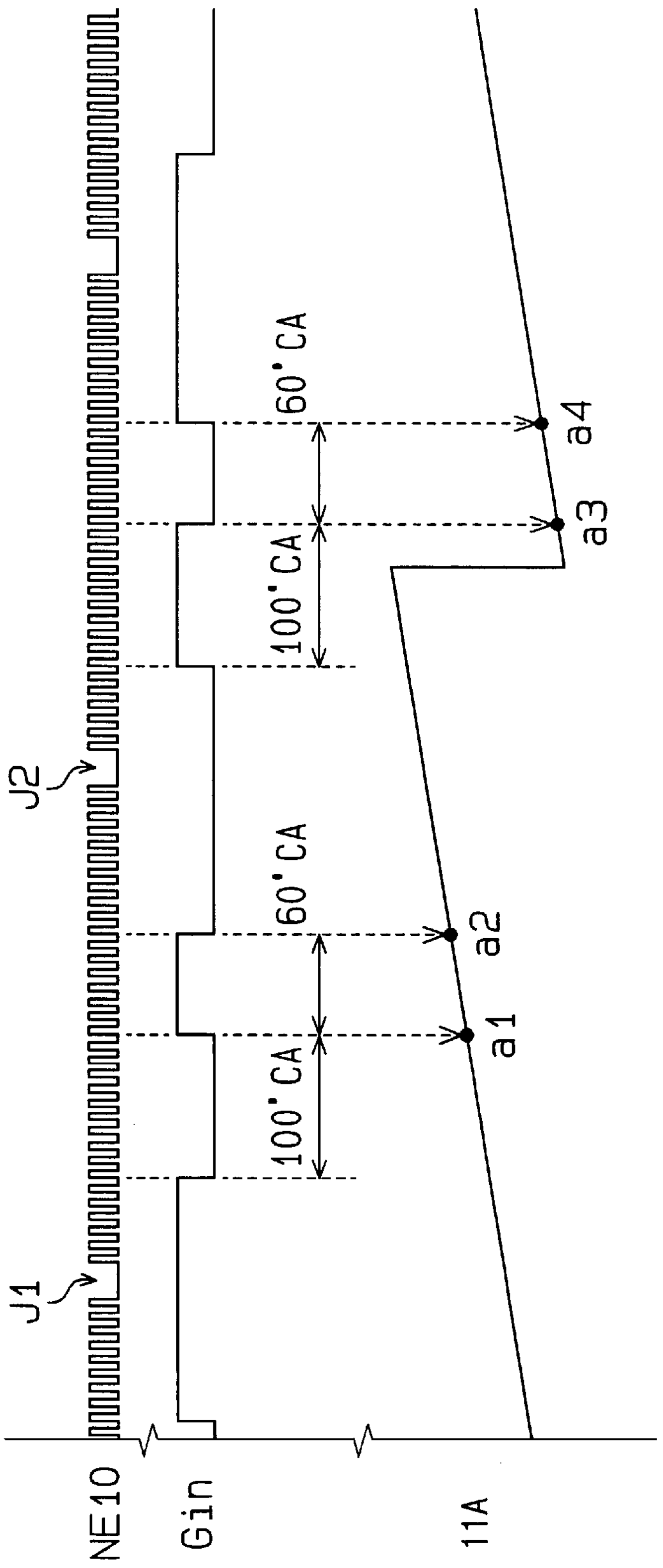
FIG. 12 is a time chart showing changes in counter values set from the NE10 signal and a Gin signal in the fifth embodiment of the present invention.

In the NE10 interrupt (FIG. 7) of the first embodiment, at the missing tooth detecting time (when the answer of step 104 is YES) after the engine start, the counter 11A is set to the initial value (24 or 60). However, in the fifth embodiment, it can be set to the initial value before the missing tooth detection. Specifically, relations in the rotation angle between the NE10 signal and the Gin signal are preset, as shown in FIG. 12. In FIG. 12, the 100° CA period of Gin=L and the 60° CA period of Gin=H are continuously prepared immediately after the first missing tooth J1. Immediately after the second missing tooth J2, on the other hand, the 100° CA period of Gin=H and the 60° CA period of Gin=L are continuously prepared. In this case, the values (e.g., a1, a2, a3 and a4 of FIG. 12) of the counter 11A at the individual edge positions of the Gin signal can be estimated and set as the initial value of the counter 11A, if there are known the effective edge number of the NE10 signal and the logic level of the Gin signal.

(Sixth Embodiment)

In the foregoing embodiments, the two rotation signals (i.e., the NE10 signal and the NE30 signal) are used to activate the two counters 11A and 11B. However, it is sufficient to make the missing tooth detection by the microcomputer 10 and the missing tooth detection by the signal processing circuit 30 selectively effective. From this point, the signal processing circuit 30 need not always have the function to generate the NE30 signal but may have at least the missing tooth detecting function (or the missing tooth detecting unit 31). In the sixth embodiment, although not shown, the missing tooth detecting unit 31 uses the missing tooth detection signal FK as the reference position signal. In the microcomputer 10, moreover, the crank counter 11C counts basically the NE10 signal (or its frequency-divided signal). The crankshaft angle position is detected by using the result of the missing tooth detection (or the detection result of the microcomputer 10 or the signal processing circuit 30) each time.

(Seventh Embodiment)

Figure 13:
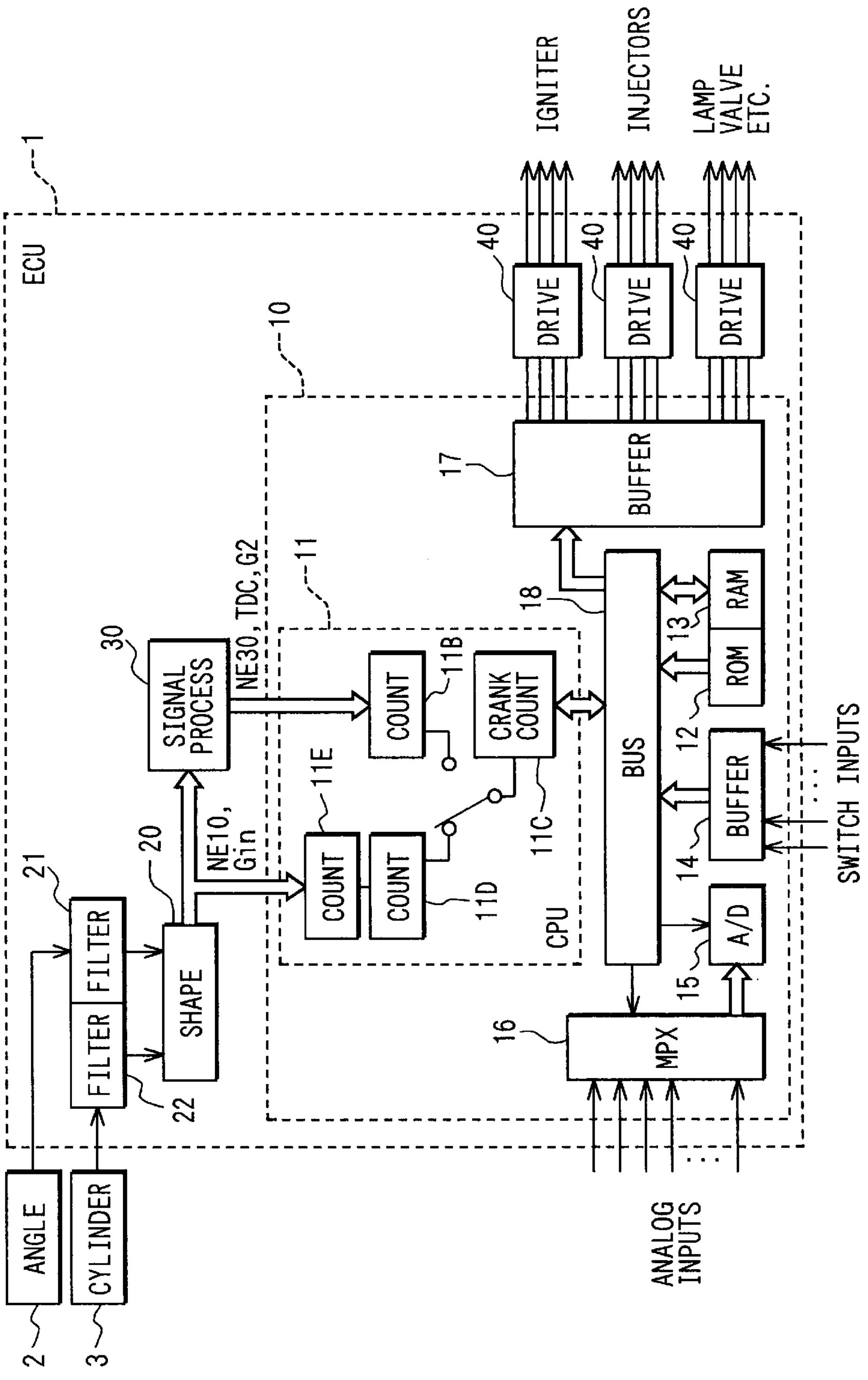
FIG. 13 is a circuit diagram showing an engine control apparatus according to the seventh embodiment of the present invention.

In the above embodiments, the counter 11A is used to make the count operation at each effective edge of the NE10 signal for the rotation position detection. However, in the seventh embodiment, counters 11D and 11E are used in place of the counter 11A as shown in FIG. 13. Specifically, the counter 11E is provided to generate a signal, which is obtained by dividing the NE10 signal by three, in response to the effective edge of the NE10 signal. The counter D is provided to count the signal of the counter E.

Figure 14:
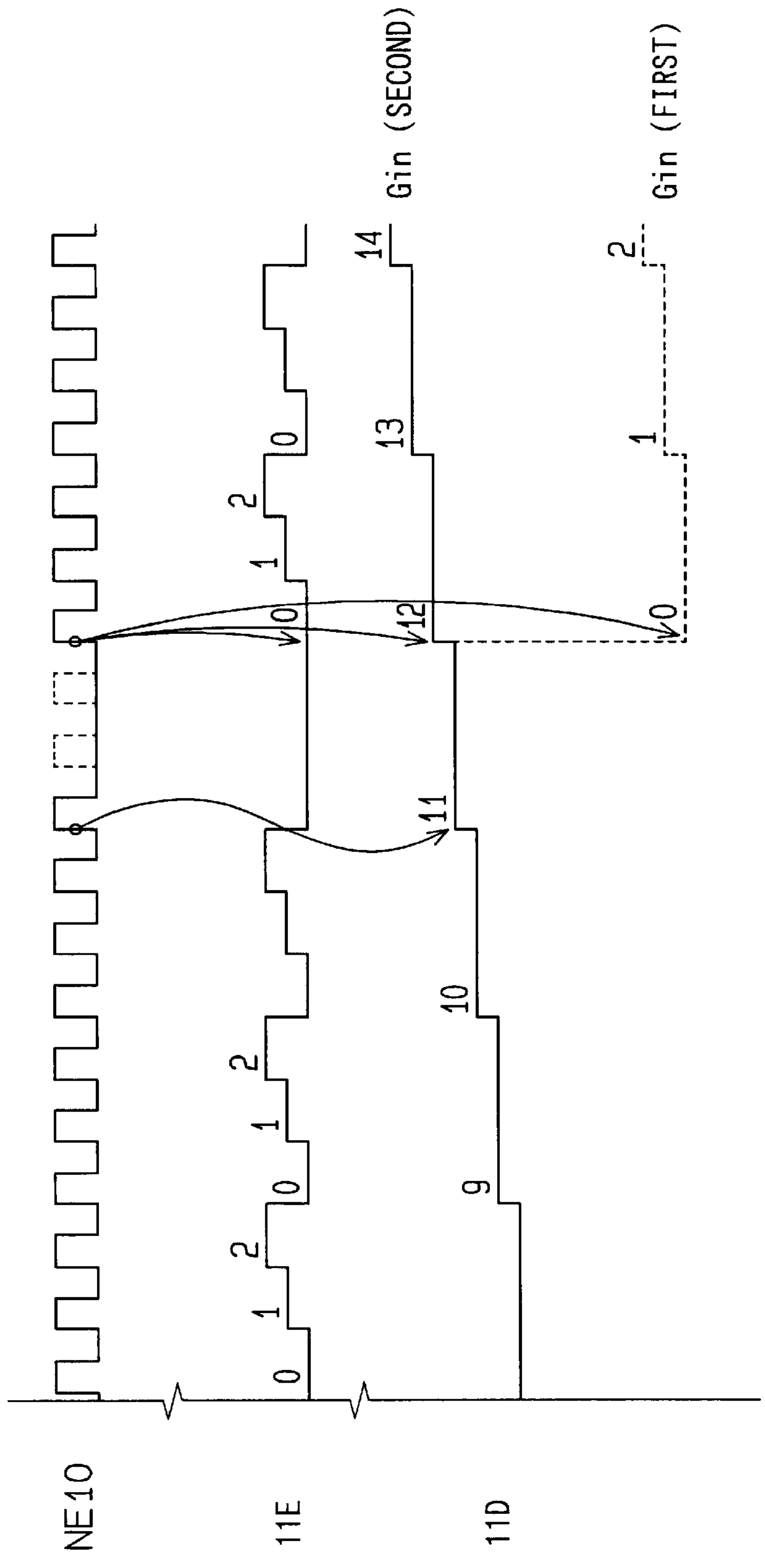
FIG. 14 is a time chart showing changes in counter values in the seventh embodiment.

As shown in FIG. 14, the NE10 signal comprises the 10° CA pulse train, which has the missing tooth corresponding to two pulses. The counter 11E makes a three-stage count operation from 0 to 2 each time the NE10 signal rises. The counter 11D counts up its count each time the count of the counter 11E is initialized to 0, that is, at every interval of 30° CA. The CPU 11 determines the arrival of either the first or the second missing tooth when the count of the counter 11D becomes 11 or 23. In this case, the count of the counter 11E is initialized to 0 at the time the rise of the next NE10 signal is detected. The count of the counter 11D is initialized to 0, when the Gin signal at the missing tooth position indicates the first missing pulse. It is however set to 12, when the Gin signal indicates the second missing pulse. The CPU 11 thus recognizes the one cycle period (720° CA) based on only the count value of the counter 11D.

Thus, by using the counter 11D, it is made possible to compare directly the count values of the counters 11B and 11D in the comparison steps 210 of FIGS. 8 and 10 or the comparison step 302 of FIG. 9. Further, because the counter 11D is used in place of the counter 11A, dividing the count value of the counter 11A by three to produce the 30° CA signal is not necessary. Therefore, step 111 (FIG. 7) for copying the count value of the counter 11A to the crank counter 11C is simplified.

In this embodiment also, the missing tooth reference value K cab be used to detect the reference position (missing tooth).

The present invention should not be limited to the disclosed embodiments, but may be implemented in many other ways without departing from the spirit of the invention.

What is claimed is:

1. An engine control apparatus comprising:

a rotation signal generating circuit for generating a rotation signal composed of a train of pulses at every interval of a predetermined angle corresponding to a partial turn of the crankshaft of an engine and having a reference position of a different pulse width intermediate the pulse train;

a signal processing circuit for measuring a pulse interval by inputting the rotation signal and for detecting the reference position on the basis of the pulse interval, to output a reference position signal corresponding to the reference position; and a microcomputer for inputting the rotation signal and the reference position signal, to detect a crankshaft angle position from the rotation signal and the reference position signal thereby to execute various controls for the engine, wherein the microcomputer is programmed to start an interrupt at each effective edge of the rotation signal, to execute the measurement of the pulse interval by the interrupt and the detection of the reference position on the basis of the pulse interval, to detect, by making the detection result of the reference position by the interrupt effective at the beginning of a start of the engine, the crankshaft angle position on the basis of the detection result, and to detect the crankshaft angle position with the reference position signal by making the reference position detection result effective when the engine is stated, and to detect the crankshaft angle position by making the reference position signal from the signal processing circuit effective in place of the result of the reference position by the interrupt when it is determined that the signal processing circuit is normally operating.

2. An engine control apparatus according to claim 1, wherein the interrupt at each effective edge of the rotation signal is stopped after the engine start, when it is determined that the signal processing circuit is normally operating.

3. An engine control apparatus according to claim 1, wherein the signal processing circuit generates, defining that the rotation signal generated by the rotation signal generating circuit is a first rotation signal, a second rotation signal composed of a train of wider pulses than those of the first rotation signal by inputting the first rotation signal, and wherein the microcomputer includes first counter means for counting every effective edges of the first rotation signal and second counter means for counting every effective edges of the second rotation signal, and is programmed to detect the crankshaft angle position by using a value of the first counter means at the beginning of the engine start and by using a value of the second counter means in place of the value of the first counter means after the engine is started and when it is determined that the signal processing circuit is normally operating.

4. An engine control apparatus according to claim 3, wherein the microcomputer is programmed to compare the value of the first counter means and the value of the second counter means and determine that the signal processing circuit is normally operating, when these values match each other continuously for a predetermined period.

5. An engine control apparatus according to claim 3, wherein the microcomputer is programmed to compares the value of the first counter means and the value of the second counter means and determine that the signal processing circuit is normally operating, when these values match each other continuously for a predetermined period and when the speed after the start reaches a predetermined speed.

6. An engine control apparatus according to claim 5, wherein the microcomputer is programmed to compare the value of the first counter means and the value of the second counter means for a time period including at least one period referring to an output of the reference position signal, thereby to determine whether or not the signal processing circuit is normal.

7. An engine control apparatus according to claim 3, wherein the microcomputer is programmed to compare the value of the first counter means and the value of the second counter means, thereby to reset the signal processing circuit if those values mismatch each other continuously for a predetermined period.

8. An engine control apparatus according to claim 3, wherein the first counter means is started to count by an interrupt prior to the second counter means.

9. An engine control apparatus according to claim 1, wherein the signal processing circuit generates, defining that the rotation signal generated by the rotation signal generating circuit is a first rotation signal, a second rotation signal composed of a train of wider pulses than those of the first rotation signal by inputting the first rotation signal, and wherein the microcomputer includes first counter means for making a count operation based on the effective edge of the first rotation signal at every period corresponding to a period of the rotation signal and second counter means for counting every effective edges of the second rotation signal, and is programmed to detect the crankshaft angle position by using a value of the first counter means at the beginning of the engine start and by using a value of the second counter means in place of the value of the first counter means after the engine is started and when it is determined that the signal processing circuit is normally operating.

10. An engine control apparatus according to claim 9, wherein the microcomputer is programmed to compare the value of the first counter means and the value of the second counter means and determine that the signal processing circuit is normally operating, when these values match each other continuously for a predetermined period.

11. An engine control apparatus according to claim 9, wherein the microcomputer is programmed to compares the value of the first counter means and the value of the second counter means and determine that the signal processing circuit is normally operating, when these values match each other continuously for a predetermined period and when the speed after the start reaches a predetermined speed.

12. An engine control apparatus according to claim 10, wherein the predetermine period is more than one period including an output of the reference position signal.

13. An engine control apparatus according to claim 9, wherein the microcomputer is programmed to compare the value of the first counter means and the value of the second counter means, thereby to reset the signal processing circuit if those values mismatch each other continuously for a predetermined period.

14. An engine control apparatus according to claim 9, wherein the first counter means is started to count by an interrupt prior to the second counter means.

15. An engine control apparatus according to claim 1, wherein the microcomputer is programmed to detect the reference position by its interrupt, when the pulse interval between the rotation signals successively generated becomes larger by more than K times, and to set K variable in accordance with an engine running state.

16. An engine control apparatus comprising:

a rotation signal generating circuit for generating a rotation signal composed of a train of pulses at every interval of a predetermined angle corresponding to a partial turn of the crankshaft of an engine and having a reference position of a different pulse width intermediate the pulse train;

a signal processing circuit for measuring a pulse interval by inputting the rotation signal and for detecting the reference position on the basis of the pulse interval, to output a reference position signal corresponding to the reference position; and a microcomputer for inputting the rotation signal and the reference position signal, to detect a crankshaft angle position from the rotation signal and the reference position signal thereby to execute various controls for the engine, wherein the microcomputer is programmed to detect the crankshaft angle position with the reference position signal from the signal processing circuit during an ordinary run of the engine by making the reference position signal effective, to start an interrupt at each effective edge of the rotation signal when a speed of the engine drops to a predetermined threshold value, to execute a measurement of the pulse interval by the interrupt and a detection of the reference position on the basis of the pulse interval, and detect, by making a detection result of the reference position by the interrupt effective, the crankshaft angle position on the basis of the detection result.

17. An engine control apparatus according to claim 16, wherein the signal processing circuit generates, assuming that the rotation signal generated by the rotation signal generating circuit is a first rotation signal, a second rotation signal composed of a train of wider pulses than those of the first rotation signal, by inputting the first rotation signal, and wherein the microcomputer includes first counter means for counting every effective edge of the first rotation signal, and second counter means for counting every effective edge of the second rotation signal, and is programmed to detect the crankshaft angle position with a value of the second counter means during the ordinary running time of the engine and the crankshaft angle position with a value of the first counter means in place of the value of the second counter means when a rotation speed of the engine drops to the predetermined threshold value.

18. An engine control apparatus according to claim 16, wherein the signal processing circuit generates, assuming that the rotation signal generated by the rotation signal generating circuit is a first rotation signal, a second rotation signal composed of a train of wider pulses than those of the first rotation signal, by inputting the first rotation signal, and wherein the microcomputer includes first counter means for making a count operation based on the effective edge of the first rotation signal at every period corresponding to a period of the rotation signal and second counter means for counting every effective edge of the second rotation signal, and is programmed to detect the crankshaft angle position with a value of the second counter means during the ordinary running time of the engine and the crankshaft angle position with a value of the first counter means in place of the value of the second counter means when a rotation speed of the engine drops to the predetermined threshold value.

* * * * *